US008565595B2

(12) United States Patent
Peng

(10) Patent No.: US 8,565,595 B2
(45) Date of Patent: Oct. 22, 2013

(54) METHOD AND APPARATUS OPTIMIZING DECISION THRESHOLD LEVEL OF OPTICAL RECEIVER

(75) Inventor: Xiao Peng, Shenzhen (CN)

(73) Assignee: ZTE Corporation, Shenzhen, Guangdong (CN)

( * ) Notice: Subject to any disclaimer, the term of this patent is extended or adjusted under 35 U.S.C. 154(b) by 271 days.

(21) Appl. No.: 13/119,172

(22) PCT Filed: Jul. 24, 2009

(86) PCT No.: PCT/CN2009/000833
§ 371 (c)(1),
(2), (4) Date: Mar. 15, 2011

(87) PCT Pub. No.: WO2010/031239
PCT Pub. Date: Mar. 25, 2010

(65) Prior Publication Data
US 2011/0182574 A1    Jul. 28, 2011

(30) Foreign Application Priority Data
Sep. 18, 2008    (CN) .......................... 2008 1 0211311

(51) Int. Cl.
*H04B 10/06*    (2011.01)
*H04B 10/00*    (2013.01)

(52) U.S. Cl.
USPC ................. 398/26; 398/24; 398/25; 398/202; 398/136; 398/209; 398/5

(58) Field of Classification Search
USPC .......................................... 398/9, 24–26, 202
See application file for complete search history.

(56) References Cited

U.S. PATENT DOCUMENTS

| | | | |
|---|---|---|---|
| 6,856,771 B2 | 2/2005 | Taga et al. | |
| 6,885,828 B1* | 4/2005 | Cornelius | 398/209 |
| 7,269,347 B1 | 9/2007 | Matricardi et al. | |
| 2003/0097624 A1* | 5/2003 | Barton et al. | 714/704 |
| 2004/0057725 A1 | 3/2004 | Lee et al. | |
| 2004/0096216 A1 | 5/2004 | Ito | |
| 2004/0105687 A1 | 6/2004 | Myong et al. | |
| 2007/0280681 A1* | 12/2007 | Frankel et al. | 398/5 |
| 2009/0097849 A1* | 4/2009 | Childers et al. | 398/79 |

FOREIGN PATENT DOCUMENTS

| | | |
|---|---|---|
| CN | 1481084 A | 3/2004 |
| CN | 1753355 A | 3/2006 |

(Continued)

OTHER PUBLICATIONS

International Search Report for PCT/CN2009/000833, Completed by the Chinese Patent Office Sep. 29, 2009, 4 Pages.

*Primary Examiner* — Oommen Jacob
(74) *Attorney, Agent, or Firm* — Brooks Kushman P.C.

(57) ABSTRACT

Method and apparatus for optimizing a decision threshold of an optical receiver is used to solve a problem of affecting system stability and reliability. The method comprises: determining a maximum value and a minimum value of an adjustment range of the decision threshold, and determining an adjustment step of the decision threshold (10); adjusting a decision threshold value within the adjustment range of the decision threshold, and separately detecting pre-FEC BERs corresponding to different decision threshold values (11); and searching for a minimum value in the detected pre-FEC BERs, a decision threshold value corresponding to the minimum value being an optimal decision threshold value (12). The apparatus comprises a decision threshold adjusting unit, a pre-FEC BER detecting unit, a decision threshold control unit and an optimal decision threshold determining unit.

13 Claims, 3 Drawing Sheets

(56) References Cited

FOREIGN PATENT DOCUMENTS

| | | |
|---|---|---|
| CN | 101359965 A | 2/2009 |
| EP | 1056229 | 11/2000 |
| EP | 1675282 A2 | 6/2006 |
| GB | 2405295 | 2/2005 |
| GB | 2423900 | 6/2006 |
| JP | 2000341344 A | 12/2000 |
| JP | 2004172783 A | 6/2004 |
| WO | 03013030 A2 | 2/2003 |
| WO | 2005043317 A2 | 5/2005 |

* cited by examiner

METHOD AND APPARATUS OPTIMIZING DECISION THRESHOLD LEVEL OF OPTICAL RECEIVER

CROSS-REFERENCE TO RELATED APPLICATION

This application is the U.S. national phase of PCT Appln. No. PCT/CN2009/000833 filed Jul. 24, 2009 which claims priority to Chinese Application Nos. 200810211311.7 filed Sep. 18, 2008, the disclosures of which are incorporated in their entirety by reference herein.

TECHNICAL FIELD

The present invention relates to the technical field of optical communication, and more particular, to a method and an apparatus for optimizing a decision threshold of an optical receiver.

TECHNICAL BACKGROUND

In an optical communication system, an optical transmitter at a transmitting end converts digital electrical signals of 0 and 1 into optical signals to be transmitted in optical fibers, and an optical receiver at a receiving end restores the optical signals to the digital electrical signals of 0 and 1 through photoelectric conversion. Ideally, a decision threshold of the optical receiver is at an average value, i.e., 50%, such that the signals of 0 and 1 can be accurately decided. However, distortion may be caused in the signals 1 and 0 due to the influence of factors, such as noise and non-linear effect of optical fibers, in the process of long-distance transmission, therefore, the decision threshold of the optical receiver is required to be adjusted to accurately decide the signals 0 and 1.

In the current optical communication system, error detection and error correction are performed on bit errors of 0 and 1 using FEC (Forward Error Correction). Optimization of the decision threshold of the optical receiver may efficiently reduce the number of pre-forward error correction bit errors of 0 and 1, i.e., the number of bit errors before the FEC. When the bit error rate before the FEC is minimum, the bit error rate after the FEC is also minimum, i.e., the bit error rate of the system is minimum. Therefore, the bit error rate before the FEC can be used as a basis for optimizing the decision threshold of the optical receiver.

The methods for optimizing the decision threshold of the optical receiver disclosed in patents CN 1753355A, US2004105687, EP1675282 and WO03013030A2 are to obtain numeric values of bit errors of 0 and 1 in real time and determine whether the difference between the bit errors of 0 and 1 is less than a preset value. If the difference is less than the preset value, it is determined that the decision threshold is not required to be adjusted; if the difference is no less than the preset value, then adjustment direction and step of the decision threshold are determined based on the difference, and the decision threshold is adjusted in real time and rapidly.

In an optical communication system under normal working condition, an optical signal-to-noise ratio in the optical receiver is very high, in which case, differences between the bit errors of 0 and 1 corresponding to all decision threshold values in a certain range are less than the preset value, for example, differences between the bit errors of 0 and 1 corresponding to decision thresholds between 30%-50% are less than the preset value. When an initial value of the decision threshold is within this range, the decision threshold obtained by the above adjustment method is an initial value of the decision threshold; when the initial value of the decision threshold is lower than this range, the decision threshold obtained by the above adjustment method is the minimum value in this range, i.e., 30%; when the initial value of the decision threshold is higher than this range, the decision threshold obtained by the above adjustment method is the maximum value in this range, i.e., 50%. It can be seen that the optimized decision threshold value obtained by the above method is associated with the initial value of the decision threshold, the decision threshold does not uniquely corresponds to the difference between the bit errors of 0 and 1, and the optimized decision threshold is obviously not the optimal value.

In the optical communication system, main factors influencing the decision threshold of the optical receiver include parameters of the optical transmitter, received optical power, optical signal-to-noise ratio, residual dispersion, etc. The influence of these factors on numeric values of bit errors 0 and 1 is complicated. When certain factors change suddenly due to the influence of the external environment on the system, using the above method to adjust the decision threshold in real time may cause large-range adjustment and shock of the decision threshold, thus resulting in performance deterioration of signals, or affecting normal communication of services in severe case.

It can be seen that the above method of adjusting the decision threshold in real time in a large range during operation of the optical receiver has a risk of affecting the stability and reliability of the system. Therefore, the large-range adjustment of the decision threshold for the optical receiver bearing services should be avoided. The large-range optimization and adjustment of the decision threshold should be performed before the optical receiver is delivered from the factory and before the services are activated, and the decision threshold should be kept unchanged or be optimized in a specified small range after the optical receiver bears the services.

SUMMARY OF THE INVENTION

The present invention provides a method and an apparatus for optimizing a decision threshold of an optical receiver so as to solve a problem of affecting system stability and reliability, which exists in the prior art method for adjusting the decision threshold in real-time in a large range during operation of an optical communication system.

The technical scheme of the present invention will be described below.

The present invention provides a method for optimizing a decision threshold of an optical receiver comprising the following steps of:

A, determining a maximum value and a minimum value of an adjustment range of the decision threshold, and determining an adjustment step of the decision threshold;

B, adjusting a decision threshold value within the adjustment range of the decision threshold, and separately detecting pre-forward error correction bit error rates (-FEC BER) corresponding to different decision threshold values; and C, searching for a minimum value in the detected pre-FEC BERs, a decision threshold value corresponding to the minimum value being an optimal decision threshold value.

Preferably, the pre-FEC BER is a sum of the number of bit errors of 0 and the number of bit errors of 1 before forward error correction in unit time.

Preferably, before the step A, the method further comprises determining system parameters of the optical receiver to be within a proper range and be kept unchanged.

Preferably, the system parameters of the optical receiver comprise received optical power, optical signal-to-noise ratio, and residual dispersion.

Preferably, in the step C, a minimum value is searched in the detected pre-FEC BERs using a sequential searching method or a segmentation searching method.

Preferably, in the step C, when there is multiple decision threshold values corresponding to the minimum value in the detected pre-FEC BERs, an intermediate value thereof is selected as the optimal decision threshold value.

The present invention provides an apparatus for optimizing a decision threshold of an optical receiver comprising a decision threshold adjusting unit, a pre-FEC BER detecting unit, a decision threshold control unit and an optimal decision threshold determining unit.

The decision threshold adjusting unit is configured to adjust a decision threshold value in an adjustment range of the decision threshold according to an adjusting instruction of the decision threshold control unit.

The pre-FEC BER detecting unit is configured to detect pre-forward error correction bit error rates (-FEC BER) corresponding to different decision thresholds and transmit the pre-FEC BERs to the decision threshold control unit.

The decision threshold control unit is configured to transmit an decision threshold adjusting instruction to the decision threshold adjusting unit, receive the pre-FEC BERs transmitted by the pre-FEC BER detecting unit, and transmit the pre-FEC BERs and the corresponding decision threshold values to the optimal decision threshold determining unit.

The optimal decision threshold determining unit is configured to receive the pre-FEC BERs and the corresponding decision threshold values sent by the decision threshold control unit, and search for a minimum value among all the detected pre-FEC BERs, a decision threshold value corresponding to the minimum value being an optimal decision threshold value.

Preferably, the pre-FEC BER is a sum of the number of bit errors of 0 and the number of bit errors of 1 before forward error correction in unit time.

Using the technical scheme of the present invention allows to determine firstly the adjustment range and adjustment step of the decision threshold before the apparatus is delivered from the factory and services are activated, and then optimize and adjust the decision threshold of the optical receiver based on the pre-FEC BERs to obtain the optimal decision threshold value corresponding to the minimum pre-FEC BER, which is the global optimal decision threshold value in a determined range, rather than a local optimal decision threshold value.

Using the technical scheme of the present invention allows to reduce firstly the adjustment range of the decision threshold and decrease the adjustment step of the decision threshold after the services are activated, and then optimize and adjust the decision threshold of the optical receiver based on the pre-FEC BERs to obtain the optimal decision threshold value after the adjustment range of the decision threshold is reduced.

Compared with the prior art, the present invention is simple to implement, avoiding shock phenomena caused when the optical receiver adjusts the decision threshold frequently in a large range in service bearing working condition.

PREFERRED EMBODIMENTS OF THE INVENTION

Figure 1:
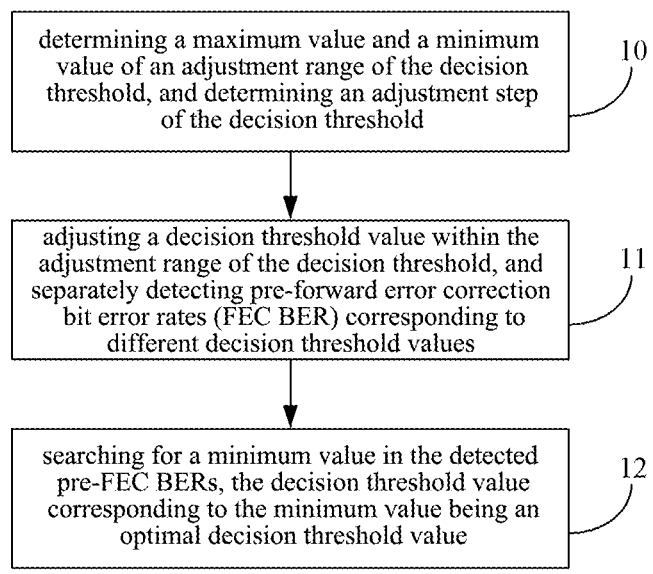
FIG. 1 is a flow chart of an implementation principle of a method for optimizing a decision threshold of an optical receiver in accordance with the present invention.

Referring to FIG. 1, there is provided a flow chart of an implementation principle of a method for optimizing a decision threshold of an optical receiver in accordance with the present invention mainly comprising the following step.

Step 10, a maximum value and a minimum value of an adjustment range of the decision threshold are determined, and an adjustment step of the decision threshold is determined.

The method further comprises, prior to the above step, determining system parameters of the optical receiver to be within a proper range and be kept unchanged. The system parameters of the optical receiver include received optical power, optical signal-to-noise ratio, and residual dispersion.

Step 11, a decision threshold value is adjusted within the adjustment range of the decision threshold, and pre-forward error correction bit error rates corresponding to different decision threshold values are detected separately, wherein the pre-FEC BER is a sum of the number of bit errors of 0 and the number of bit errors of 1 before forward error correction in unit time.

Step 12, a minimum value is searched in the detected pre-FEC BERs, a decision threshold value corresponding to the minimum value being an optimal decision threshold value.

In this step, the minimum value may be searched in the detected pre-FEC BERs using a sequential searching method or a segmentation searching method, and when there is multiple decision threshold values corresponding to the minimum value in the detected pre-FEC BERs, an intermediate value thereof is selected as the optimal decision threshold value.

Different system parameters, such as the received optical power, optical signal-to-noise ratio, residual dispersion, correspond to different optimal decision thresholds. Therefore, the system parameters should remain unchanged when the decision threshold of the optical receiver is optimized using the above method. When the received optical power, optical signal-to-noise ratio, residual dispersion change and the original decision threshold value has not been the optimal decision threshold, a new optimal decision threshold value can be obtained by using the method in accordance with the present invention again.

Figure 2:
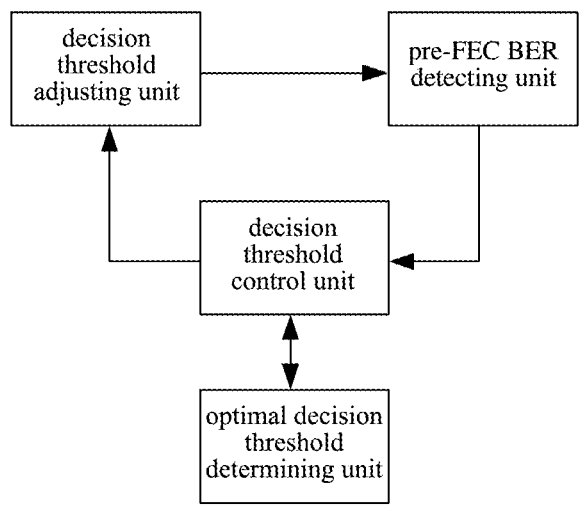
FIG. 2 is a block diagram of an apparatus for optimizing a decision threshold of an optical receiver in accordance with the present invention.

In accordance with the above method of the present invention, the present invention further provides an apparatus for optimizing a decision threshold of an optical receiver. Referring to FIG. 2, there is provided a block diagram of an apparatus for optimizing a decision threshold of an optical receiver in accordance with the present invention mainly comprising a decision threshold adjusting unit, a pre-FEC BER detecting unit, a decision threshold control unit and an optimal decision threshold determining unit.

The decision threshold adjusting unit is configured to adjust the current decision threshold value in an adjustment range of the decision threshold according to a instruction of the decision threshold control unit.

The pre-FEC BER detecting unit is configured to separately detect pre-FEC BERs corresponding to different decision threshold values and transmit the detected pre-FEC BERs to the decision threshold control unit, wherein the pre-FEC BER is a sum of the number of bit errors of 0 and the number of bit errors of 1 before forward error correction in unit time.

The decision threshold control unit is configured to transmit an decision threshold adjusting instruction to the decision threshold adjusting unit, receive the pre-FEC BERs transmitted by the pre-FEC BER detecting unit, and transmit the pre-FEC BERs and decision threshold values to the optimal decision threshold determining unit.

The optimal decision threshold determining unit is configured to receive the pre-FEC BERs and decision threshold values sent by the decision threshold control unit, and search for a minimum value among the detected pre-FEC BERs, a decision threshold value corresponding to the minimum value being an optimal decision threshold value.

The specific implementation of the present invention will be further described in detail below in the specific embodiments.

Figure 3:
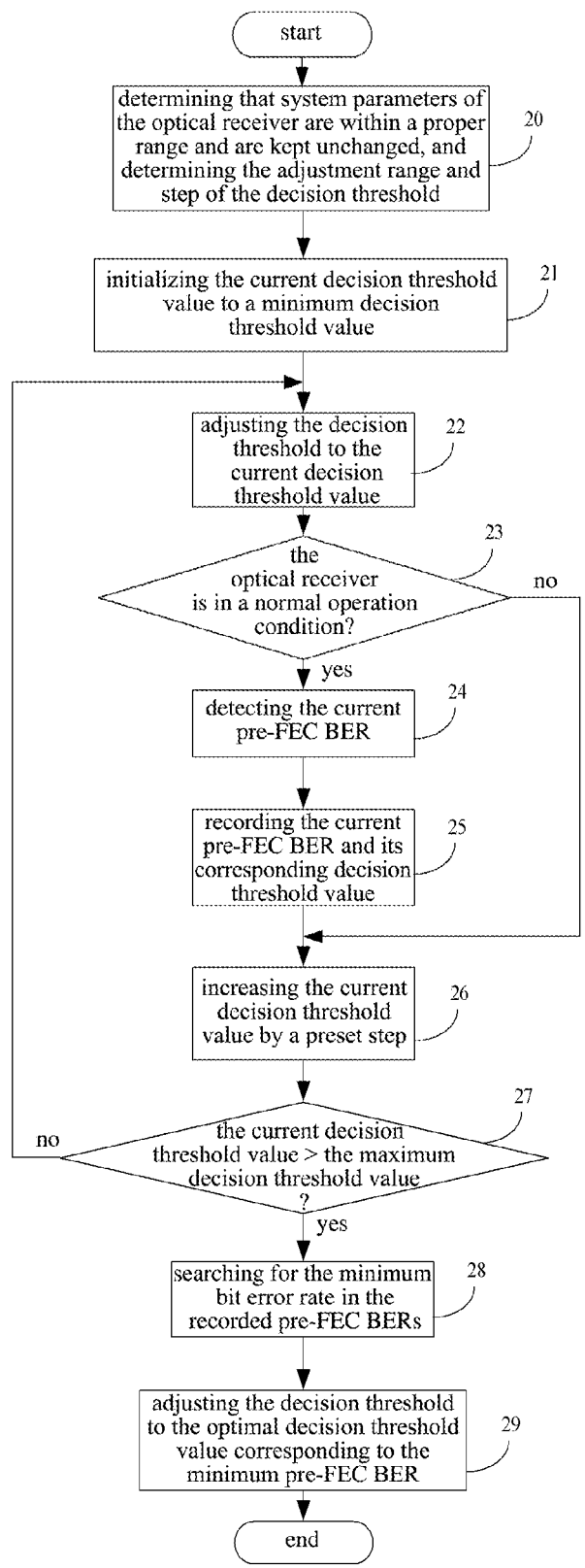
FIG. 3 is a flow chart of a preferred embodiment of a method for optimizing a decision threshold of an optical receiver in accordance with the present invention.

Referring to FIG. 3, there is provided a flow chart of a preferred embodiment of a method for optimizing a decision threshold of an optical receiver in accordance with the present invention mainly comprising the following steps.

Step 20, system parameters of the optical receiver, such as received optical power, optical signal-to-noise ratio, residual dispersion, are determined to be within a proper range, and a maximum value and a minimum value of an adjustment range of the decision threshold and an adjustment step of the decision threshold are determined. For example, the minimum decision threshold value is determined to be 20%, and the maximum decision threshold value is determined to be 70%. The minimum adjustment step of the decision threshold is determined by the accuracy of the digital potentiometer for adjusting the decision threshold. When an 8-byte digital potentiometer is used, the minimum step is about 0.4%. Generally, the step is preset to be the minimum step ×N, where N=1, 2, 3, . . . . The smaller the N is, the longer the time for optimizing the decision threshold is; the greater the N is, the shorter the time for optimizing the decision threshold is.

Step 21, the current decision threshold value is initialized to the minimum decision threshold value.

Step 22, the decision threshold is adjusted to the current decision threshold value.

Step 23, the optical receiver is determined whether to be in normal working condition, if yes, step 24 is performed, otherwise, the process proceeds to step 26; the optical receiver being in the normal working condition means that there is no signal loss alarm or frame loss alarm and the pre-FEC BER is less than $10^{-4}$.

Step 24, the current pre-FEC BER is detected.

Step 25, the current pre-FEC BER and its corresponding decision threshold value are recorded.

Step 26, the current decision threshold value is increased by a preset step.

Step 27, the current decision threshold value is determined whether to be greater than the maximum decision threshold value, if yes, step 28 is performed, otherwise, the process returns to step 22.

Step 28, the minimum bit error rate is searched in the recorded pre-FEC BERs, with its corresponding decision threshold value being the optimal decision threshold value. When the decision threshold value corresponding to the minimum bit error rate is not one value but a set of values, an intermediate value among the set of values is selected as the optimal decision threshold value.

Step 29, the decision threshold is adjusted to the optimal decision threshold value corresponding to the minimum pre-FEC BER, thus, the optimization is completed.

Figure 4:
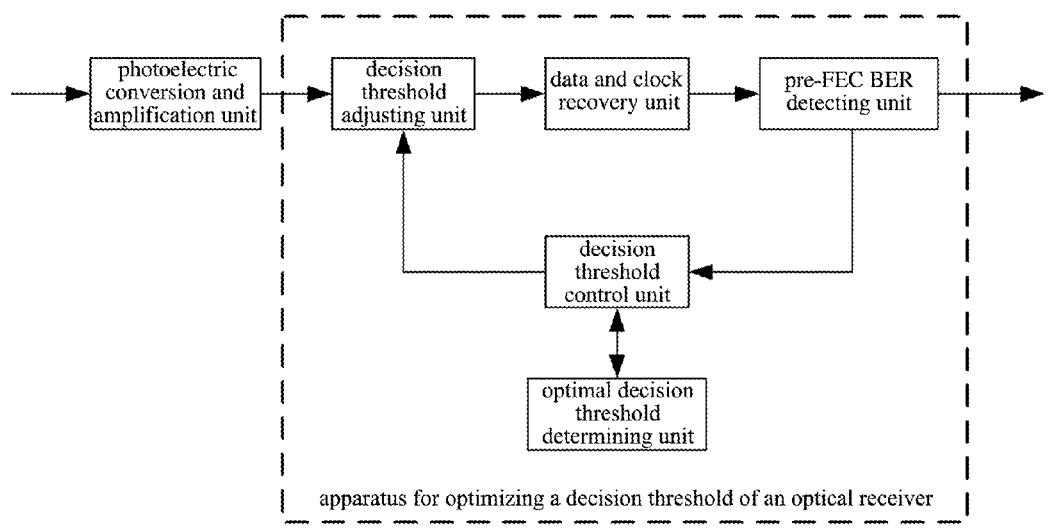
FIG. 4 is a block diagram of a preferred embodiment of an apparatus for optimizing a decision threshold of an optical receiver in accordance with the present invention.

Referring to FIG. 4, there is provided a block diagram of a preferred embodiment of an apparatus for optimizing a decision threshold of an optical receiver in accordance with the present invention mainly comprising a decision threshold adjusting unit, a data and clock recovery unit, a pre-FEC BER detecting unit, a decision threshold control unit and an optimal decision threshold determining unit.

The decision threshold adjusting unit is configured to adjust a decision threshold value of electrical signals output by a photoelectric conversion and amplification unit in the optical receiver in an adjustment range of the decision threshold according to an adjusting instruction of the decision threshold control unit.

The data and clock recovery unit is configured to separate data signals and clock signals from the electrical signal stream output by the decision threshold adjusting unit, and perform serial-to-parallel conversion on the data signals and then transmit them to the pre-FEC BER detecting unit.

The pre-FEC BER detecting unit is configured to detect pre-FEC BERs corresponding to decision threshold values of the data signals input by the data and clock recovery unit, and transmit the pre-FEC BERs to the decision threshold control unit.

The decision threshold control unit is configured to transmit an decision threshold adjusting instruction to the decision threshold adjusting unit, receive the pre-FEC BERs transmitted by the pre-FEC BER detecting unit, and transmit the pre-FEC BERs and decision threshold values to the optimal decision threshold determining unit. The decision threshold adjusting instruction sent out for the first time specifies the decision threshold to be the minimum value in a range of the decision threshold values, and subsequently the decision threshold is increased by a preset step in an adjusting instruction which is sent out each time under triggering of the pre-FEC BER detecting unit, until it reaches the maximum value in the range of the decision threshold values. Whenever one decision threshold adjusting instruction is sent out, a corresponding pre-FEC BER will be received.

The optimal decision threshold determining unit is configured to receive the pre-FEC BERs and decision threshold values sent by the decision threshold control unit, and search for a minimum value among the detected pre-FEC BERs, a decision threshold value corresponding to the minimum value being an optimal decision threshold value.

Obviously, those skilled in the art may make various modifications and variations to the present invention without departing from the spirit and scope of the present invention. Thus, if such modifications and variations of the present invention fall within the scope of the claims of the present invention and equivalent technology thereof, then it is intended that the present invention also includes these modifications and variations.

INDUSTRIAL APPLICABILITY

Using the technical scheme of the present invention allows to determine firstly the adjustment range and adjustment step of the decision threshold before the apparatus is delivered from the factory and services are activated, and then optimize and adjust the decision threshold of the optical receiver based on the pre-FEC BERs to obtain the optimal decision threshold value corresponding to the minimum pre-FEC BER, which is the global optimal decision threshold value in a determined range, rather than a local optimal decision threshold value.

Using the technical scheme of the present invention allows to reduce firstly the adjustment range of the decision threshold and decrease the adjustment step of the decision threshold after the services are activated, and then optimize and adjust the decision threshold of the optical receiver based on the pre-FEC BERs to obtain the optimal decision threshold value after the adjustment range of the decision threshold is reduced.

What we claim is:

1. A method for optimizing a decision threshold of an optical receiver implemented with an apparatus which comprises a decision threshold adjusting unit, a pre-forward error correction bit error rate (pre-FEC BER) detecting unit, a decision threshold control unit and an optimal decision threshold determining unit, comprising the following steps of:

A, the decision threshold control unit determining a maximum value and a minimum value of an adjustment range of the decision threshold and an adjustment step of the decision threshold, and transmitting a decision threshold adjusting instruction to the decision threshold adjusting unit;

B, the decision threshold adjusting unit, when receiving the decision threshold adjusting instruction, adjusting within the adjustment range of the decision threshold a decision threshold value by adding the determined adjustment step of the decision threshold, and transmitting the adjusted decision threshold value to the pre-FEC BER detecting unit and feeding the adjusted decision threshold value back to the decision threshold control unit;

C, the pre-FEC BER detecting unit, when receiving the adjusted decision threshold value, detecting a pre-FEC BER corresponding to the adjusted decision threshold value, and transmitting the pre-FEC BER corresponding to the adjusted decision threshold value to the decision threshold control unit;

D, the decision threshold control unit transmitting the pre-FEC BER and the corresponding adjusted decision threshold value to the optimal decision threshold determining unit, judging whether the adjusted decision threshold value is greater than the maximum value of the adjustment range of the decision threshold; and, if not transmitting another decision threshold adjusting instruction to the decision threshold adjusting unit and returning to the step B; and if yes, transmitting an optimal decision threshold determining instruction to the optimal decision threshold determining unit and going to step E;

E, the optimal decision threshold determining unit receiving pre-FEC BERs and corresponding decision threshold values sent by the decision threshold control unit more than one time, searching for a minimum value in the detected pre-FEC BERs when receiving the optimal decision threshold determining instruction, and setting a decision threshold value corresponding to the minimum value in the detected pre-FEC BERs as an optimal decision threshold value.

2. The method according to claim 1, wherein the pre-FEC BER is a sum of the number of bit errors of 0 and the number of bit errors of 1 before forward error correction in unit time.

3. The method according to claim 1, before the step A, the method further comprising determining system parameters of the optical receiver to be within a proper range and be kept unchanged.

4. The method according to claim 3, wherein the system parameters of the optical receiver comprise received optical power, optical signal-to-noise ratio, and residual dispersion.

5. The method according to claim 1, wherein in the step E, a minimum value is searched in the detected pre-FEC BERs using a sequential searching method or a segmentation searching method.

6. The method according to claim 1, wherein in the step E, when there is multiple decision threshold values corresponding to the minimum value in the detected pre-FEC BERs, an intermediate value of the multiple decision threshold values is selected as the optimal decision threshold value.

7. An apparatus for optimizing a decision threshold of an optical receiver comprising a decision threshold adjusting unit, a pre-FEC BER detecting unit, a decision threshold control unit and an optimal decision threshold determining unit, wherein the decision threshold control unit is configured to determine a maximum value and a minimum value of an adjustment range of the decision threshold and an adjustment step of the decision threshold, and transmit a decision threshold adjusting instruction to the decision threshold adjusting unit;

the decision threshold adjusting unit is configured to, when receiving the decision threshold adjusting instruction, adjust within the adjustment range of the decision threshold a decision threshold value by adding the determined adjustment step of the decision threshold, and transmit the adjusted decision threshold value to the pre-FEC BER detecting unit and feed the adjusted decision threshold value back to the decision threshold control unit;

the pre-FEC BER detecting unit is configured to receive the adjusted decision threshold value, detect a pre-forward error correction bit error rate (pre-FEC BER) corresponding to the adjusted decision threshold value, and transmit the pre-FEC BER corresponding to the adjusted decision threshold value to the decision threshold control unit;

the decision threshold control unit is further configured to receive the pre-FEC BER corresponding to the adjusted decision threshold value from the pre-FEC BER detecting unit and the adjusted decision threshold value from the decision threshold adjusting unit, and transmit the pre-FEC BER and the corresponding adjusted decision threshold value to the optimal decision threshold determining unit; and, judge whether the adjusted decision threshold value is greater than the maximum value of the adjustment range of the decision threshold, if not, transmit another decision threshold adjusting instruction to the decision threshold adjusting unit to adjust the decision threshold value by adding the determined adjustment step of the decision threshold again, and if yes, transmit an optimal decision threshold determining instruction to the optimal decision threshold determining unit; and the optimal decision threshold determining unit is configured to receive pre-FEC BERs and corresponding decision threshold values sent by the decision threshold control unit more than one time; and, when receiving the optimal decision threshold determining instruction, search for a minimum value in the received pre-FEC BERs, and set a decision threshold value corresponding to the minimum value in the received pre-FEC BERs as an optimal decision threshold value.

8. The apparatus according to claim 7, wherein the pre-FEC BER is a sum of the number of bit errors of 0 and the number of bit errors of 1 before forward error correction in unit time.

9. The method according to claim 1, after the step A and before the step B, the method further comprising indicating a decision threshold initial value to be the minimum value of the adjustment range of the decision threshold.

10. The method according to claim 1, further comprising repeating the steps A, B, C, D and E to determine a new optimal decision threshold value when system parameters of the optical receiver change.

11. The apparatus according to claim 7, wherein the decision threshold control unit is further configured to indicate a decision threshold initial value of the decision threshold adjusting unit to be the minimum value of the adjustment range of the decision threshold.

12. The apparatus according to claim 7, wherein the decision threshold adjusting unit, the pre-FEC BER detecting unit, the decision threshold control unit and the optimal decision threshold determining unit are configured to repeat their own operations to determine a new optimal decision threshold value when system parameters of the optical receiver change; wherein the system parameters of the optical receiver comprise received optical power, optical signal-to-noise ratio, and residual dispersion.

13. The apparatus according to claim 7, wherein the optimal decision threshold determining unit is further configured to, when there is multiple decision threshold values corresponding to the minimum value in the received pre-FEC BERs, select an intermediate value of the multiple decision threshold values as the optimal decision threshold value.

* * * * *